US010069683B2

(12) United States Patent
Iordache (10) Patent No.: US 10,069,683 B2
(45) Date of Patent: Sep. 4, 2018

(54) APPARATUS FOR OPTIMISING A CONFIGURATION OF A COMMUNICATIONS NETWORK DEVICE (71) Applicant: Florinel Iordache, Bucharest (RO)

(72) Inventor: Florinel Iordache, Bucharest (RO)

(73) Assignee: NXP USA, Inc., Austin, TX (US)

( * ) Notice: Subject to any disclaimer, the term of this patent is extended or adjusted under 35 U.S.C. 154(b) by 191 days.

(21) Appl. No.: 15/024,446

(22) PCT Filed: Sep. 27, 2013

(86) PCT No.: PCT/IB2013/058938
§ 371 (c)(1),
(2) Date: Mar. 24, 2016

(87) PCT Pub. No.: WO2015/044719
PCT Pub. Date: Apr. 2, 2015

(65) Prior Publication Data
US 2016/0241435 A1 Aug. 18, 2016

(51) Int. Cl.
G06F 15/177 (2006.01)
G06F 15/16 (2006.01)
(Continued)

(52) U.S. Cl.
CPC ........ H04L 41/083 (2013.01); H04L 41/0816 (2013.01); H04L 41/0823 (2013.01);
(Continued)

(58) Field of Classification Search
CPC ............. H04L 41/083; H04L 41/0816; H04L 41/0823; H04L 41/20; H04L 43/026; H04L 43/04; H04L 43/062; H04L 43/0876
(Continued)

(56) References Cited

U.S. PATENT DOCUMENTS 5,638,494 A 6/1997 Pinard et al.
6,597,660 B1 7/2003 Rueda et al.
(Continued)

FOREIGN PATENT DOCUMENTS

EP 1317097 B1 11/2007
EP 2372962 A1 10/2011

OTHER PUBLICATIONS

International Search Report for the International application No. PCT/IB2013/058938 dated May 29, 2014.
(Continued)

Primary Examiner — Melvin H Pollack (57) ABSTRACT

Apparatus (110) for configuring network equipment or devices (101a-101n) during runtime is particularly applicable to network equipment based on QorIQ (trade mark) communication platforms for DPAA (Data Path Acceleration Architecture) optimization purposes and provides a way maintaining an optimal configuration which can change over time acccording to real traffic conditions. The invention may be implemented with any kind of adaptation algorithm for targeting different DPAA features. A flow characteristic function is determined from collected traffic statistics for a multiplicity of traffic flows classified by a common property such as protocol or destination or source. Flow properties are characterized over time, past present and future prediction and in relation to other existing flows based on assigned priorities. A computed flow characteristic function represents the basis for all adaptation algorithms which may be implemented in order to optimize the various DPAA features. In contrast with conventional methods which adapt traffic to system constraints, the apparatus of the present invention itself continuously adapts to traffic dynamics in order to maintain an optimal configuration over an extended period of time.

13 Claims, 4 Drawing Sheets (51) Int. Cl.
*H04L 12/24* (2006.01)
*H04L 12/26* (2006.01)

(52) U.S. Cl.
CPC ............ *H04L 41/20* (2013.01); *H04L 43/026* (2013.01); *H04L 43/04* (2013.01); *H04L 43/062* (2013.01); *H04L 43/0876* (2013.01)

(58) Field of Classification Search
USPC ........................................................ 709/220
See application file for complete search history.

(56) References Cited

U.S. PATENT DOCUMENTS

| | | | |
|---|---|---|---|
| 7,639,613 B1 | 12/2009 | Ghannadian et al. | |
| 8,274,891 B2 | 9/2012 | Averi et al. | |
| 9,295,065 B2* | 3/2016 | Dahod | H04N 21/6131 |
| 9,407,518 B2* | 8/2016 | Kay | H04L 43/026 |
| 9,509,720 B2* | 11/2016 | Shenefiel | H04L 63/20 |
| 9,577,906 B2* | 2/2017 | Ferreira | H04L 43/0876 |
| 9,628,387 B2* | 4/2017 | Crisan | H04L 47/11 |
| 9,654,406 B2* | 5/2017 | Chen | H04L 47/33 |
| 9,692,775 B2* | 6/2017 | Zhang | H04L 43/024 |
| 9,717,088 B2* | 7/2017 | Reisslein | H04W 72/0453 |
| 9,722,934 B2* | 8/2017 | Muniraju | H04L 47/25 |
| 9,729,450 B2* | 8/2017 | Beecroft | H04L 47/122 |
| 9,747,453 B2* | 8/2017 | Leconte | G06F 21/577 |
| 9,785,486 B2* | 10/2017 | Qian | G06F 9/542 |
| 9,806,972 B2* | 10/2017 | Edwards | H04L 43/0852 |
| 9,807,644 B2* | 10/2017 | Ma | H04W 28/0289 |
| 9,832,090 B2* | 11/2017 | Bugenhagen | H04L 43/0829 |
| 2010/0145755 A1 | 6/2010 | Narkilahti | |
| 2010/0281388 A1 | 11/2010 | Kane et al. | |
| 2013/0201852 A1 | 8/2013 | Chou et al. | |
| 2015/0295808 A1* | 10/2015 | O'Malley | H04L 47/22 709/224 |
| 2016/0100230 A1* | 4/2016 | Ma | H04N 21/44209 725/109 |
| 2016/0112896 A1* | 4/2016 | Karampatsis | H04W 28/0252 370/230.1 |
| 2017/0171017 A1* | 6/2017 | Licardie | H04L 41/0668 |
| 2017/0192921 A1* | 7/2017 | Wang | G06F 12/0811 |

OTHER PUBLICATIONS

Freeescale "QorIQ DPAA Primer for Software Architecture," White Paper, Doc. No. QORIQDPAAWP, Rev. 0, Jun. 2012, 39 pages.
Freescale "QorIQ Data Path Acceleration Architecture (DPAA) Reference Manual" Rev. 2, Nov. 2011, Chapters 1 and 6; 359 pages.

* cited by examiner

APPARATUS FOR OPTIMISING A CONFIGURATION OF A COMMUNICATIONS NETWORK DEVICE

FIELD OF THE INVENTION

This invention relates to an apparatus for optimising a configuration of communications network device or network equipment and has particular, though not exclusive, application to network equipment or devices which are based on communication platforms using Data Path Acceleration Architecture (DPAA) technology.

BACKGROUND OF THE INVENTION

One example of such a communication platform is the Freescale QorIQ (trade mark) multicore communication platform. DPAA is an architecture which can provide the infrastructure required for high-speed packet processing by allowing efficient communication between network interfaces, hardware accelerators and microprocessor cores. Network equipment and devices based on such communication platforms need a certain initial DPAA configuration setup to be applied to them at an initialisation stage in order to operate according to specifications. Dynamic reconfiguration can be applied online during a runtime stage based on new requirements. However, such configurations which may be manually applied by a user at initialisation or during runtime are not necessarily optimal in aspects such as traffic processing accuracy, execution speed internal resource management and communication efficiency between different DPAA modules. U.S. Pat. No. 5,638,494 discloses an adaptive communication system which has the ability to adapt itself to the needs of its users. However it cannot adapt to network traffic conditions. U.S. Pat. No. 7,639,613 describes a method for monitoring traffic in a communications system but cannot adjust system behaviour based on traffic changes. U.S. Pat. No. 6,597,660 describes a method for characterising communications traffic based on arrival timing information. U.S. Pat. No. 8,274,891 discloses a method which performs a characterisation between multiple WAN paths by generating quality reports based on packet loss, bandwidth allocation and other parameters. EP 1317097 describes a system which collects data from several pieces of network equipment and analyses the data in a supervisor module. The purpose is to adapt the acquisition of data to current traffic conditions by removing or adding probes or changing measurement parameters. None of the known systems provides the facility for adjusting system behaviour based on traffic changes.

SUMMARY OF THE INVENTION

The present invention provides an apparatus for optimising configuration of a communications network device as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Herein, a traffic flow is defined as a stream of packets observed at a specific node and showing a number of common properties. Such properties may be the same protocol, the same source, the same destination and other similarities between specified protocol fields.

Figure 1:
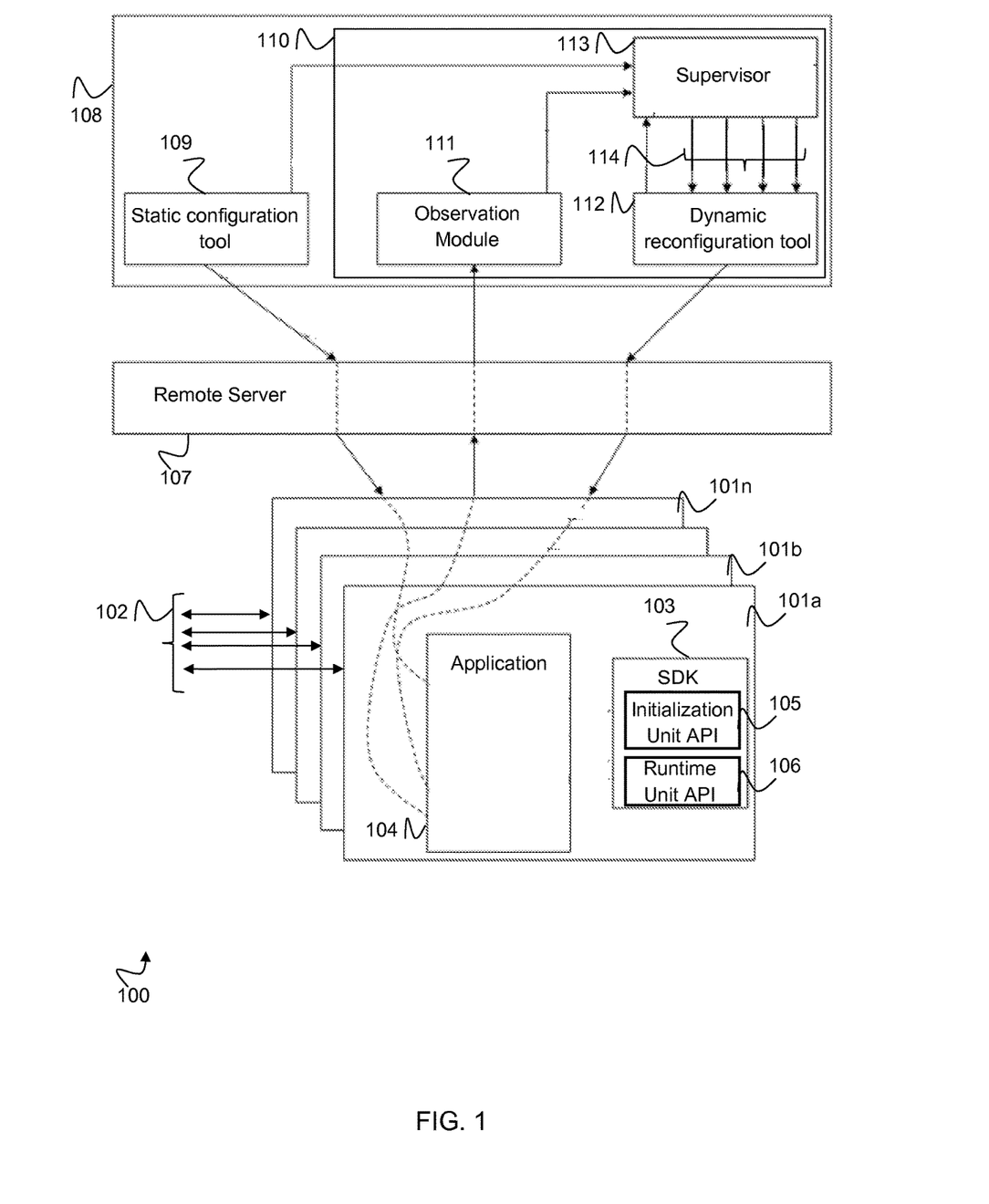
FIG. 1 schematically shows a system including an example embodiment of apparatus for optimising a configuration of one or more network devices comprising the system.

FIG. 1 shows a schematic representation of a system which in this example comprises a network infrastructure 100 which may be a DPAA architecture infrastructure. DPAA or Data Path Acceleration Architecture is a comprehensive architecture available on QorIQ (trade mark) multicore communication platforms which provides the infrastructure required for high speed packet processing by allowing efficient communication between network interfaces, hardware accelerators and cores. DPAA significantly reduces software overhead by offloading several aspects of packet processing and simultaneously addressing issues and requirements associated with multicore processing.

DPAA is described in "QorIQ Data Path Acceleration Architecture (DPAA) Reference Manual" Rev. 2 11/2011 available from the website www.freescale.com and in "QorIQ DPAA Primer for Software Architecture" Freescale Semiconductor White Paper, Document Number QORIQD-PAAWP, Rev. 0, 06/2012. This latter document may be downloaded from the website http://freescale.comffiles/32bit/doc/white_paper/QORIQDPAAWP.pdf. The primary goals of DPAA are the following: to provide intelligence within the IO (input/output) portion of a SoC (semiconductor on chip), to route and manage the processing work associated with traffic flows and to simplify the ordering and load balance concerns associated with multicore processing. Briefly, the Freescale Semiconductor DPAA is composed of several hardware components: FMan (Frame Manager) responsible for ingress traffic inspection and splitting in different flows according to configurable PCD (Parse-Classify-Distribute) functionality, rate based policing and egress traffic transmission, BMan (Buffer Manager) responsible for buffer pools management, QMan (Queue Manager) designed to facilitate safe and efficient communication between hardware accelerators and cores based on producer/consumer pattern, SEC (Security Engine) designed for offload cryptographic processing with support for several security algorithms and header processing for several security protocols, Pattern Marching Engine (PME) responsible for deep packet inspection and data stream scanning for patterns based on regular expression mechanism. FMan PCD (Parse-Classify-Distribute) provides the ability to classify the incoming traffic in different flows based on parser results and then distribute them to different queues for further processing purpose. FMan Hardware Parser performs multi-layer header parsing and validation at wire speed for a wide range of standard protocols at L2, L3, L4 layers. Line rate hashing, packet spreading and distribution to frame queues (FQs) is supported by FMan hardware and configurable by initialization software. Coarse classification provides exact matching functionality by performing look-up using a user defined key built from different frame fields according to parsing results. Coarse classification matching tables (CC Tables) are user configurable, each entry containing data to match, an optional mask and Action Descriptor (AD). Policer profile configuration allows selection of desired policing algorithm: Dual rate three colour marker algorithm mode or Pass-through mode, as well as two corresponding traffic rates: Peak Information Rate (PIR)/Committed Information Rate (CIR) and two burst rates: Peak Burst Size (PBS)/Committed Burst Size (CBS). All available policing modes can be configured to run in colour-aware or colour-blind mode at packet or byte rate modes. Resource reservation allows pre-allocation of MURAM memory for classification tables or proper order of PCD elements initialization.

DPAA may also provide support for advanced packet processing features like IP Fragmentation & Reassembly, Header Manipulation and Frame replication. Congestion management and avoidance may be supported inside QMan by Congestion groups and can be configured by defining several Congestion group records (CGR). Each congestion group record can manage any number of frame queues by using WRED mechanism. WRED (Weighted Random Early Discard) queue management algorithm is used to drop incoming packets during congestion situations with linear increasing discard probability based on configurable WRED curves for each of the three frame colours (green, yellow, red).

Returning to FIG. 1, the infrastructure 100 may include one or more network devices (or pieces of network equipment) 101a, 101b, . . . 101n which receive and transmit traffic on lines 102 from and to external nodes (not shown). Each network device 101a-101n may typically include software which may comprise SDK (Software Development Kit) software 103 and user application software 104. Typically, SDK software comprises a set of hardware specific libraries which provide the ability to access hardware specific features by exposed API (Application Protocol Interface) at two different stages. These two stages may comprise an initialisation stage which may be enabled by an initialisation unit API 105 and a runtime stage which may be enabled via a runtime unit API 106. The user application software 104 may be a user specific software component which implements network equipment specific behaviour and may also be built from two major internal components that define desired behaviour at initialisation and runtime stages. The user application software 104 may also include an agent with "command interpreter." This may provide the necessary infrastructure for receiving commands, executing them and sending back a response.

The network devices 101a . . . 101n may be connected via a remote server 107 to a host computer 108 which may comprise a personal computer or laptop. The remote server 107 may be arranged to facilitate a remote connection between the host computer 108 and the multiplicity of network devices 101a . . . 101n. The host computer 108 may be provided with a static configuration tool 109 for static configuration purposes in respect of each network device 101a . . . 101n.

Apparatus 110 for optimising a configuration of one or more of the network devices 101a . . . 101n may be implemented in the host computer 108. The apparatus 110 may comprise an observation module 111, a dynamic reconfiguration tool 112 and a supervisor module 113. The apparatus 110 may be arranged to enable dynamic reconfiguration of one or more network devices 101a . . . 101n for optimal performance depending on monitored traffic flow conditions.

The static configuration tool 109, observation module 111 and dynamic reconfiguration tool 112 may be considered to be a user interaction layer in the host computer 108 in this embodiment. The supervisor module 113 may be considered to comprise an adaptive layer in the host computer 108.

The supervisor module 113 may be arranged to receive DPAA statistics from the observation module 111. The statistics may be received at periodic time intervals. Such statistics may relate to traffic load. In some embodiments, traffic statistics may include frame load, enqueued frames and/or dropped frames per traffic flow. In one embodiment, the supervisor module 113 may be provided with an initial configuration of the network devices 101a-10n in addition to receiving the DPAA a statistics. In one embodiment, the supervisor module 113 may be turned on and off at a user's request.

The supervisor module 113 may be arranged to determine, from the DPAA statistics a flow characteristic function. A flow characteristic function may be used by the supervisor module to characterise one traffic flow in relation to all other existing traffic flows. The supervisor module 113 may be arranged to use a determined flow characteristic function in an adaptation algorithm. The supervisor module 113 may be arranged to use a flow characteristic in several different adaptation algorithms which may address different DPAA features or modules or the network devices 101a . . . 101n, for example. Using an adaptation algorithm, the supervisor module may be arranged to determine values of one or more parameters or sets of parameters which relate to a configuration of a DPAA feature, module or network device 101a, . . . 101n and which may require adjustment form a current value in order to optimise usage of the network infrastructure comprising the network devices 101a, . . . 101n, for example. Such "adjusted parameters" which may be output from the supervisor module 113 may comprise, for example, a maximum frame discard probability, minimum threshold byte count, maximum threshold byte count. The supervisor module 103 may be arranged to output the values of the determined parameters or sets of parameters to the dynamic reconfiguration tool 112. The dynamic reconfiguration tool 112 may be arranged to adjust a current configuration of one or more network devices 101a . . . 101n in accordance with the output from the supervisor module. 113.

An initial configuration for a network device 101a . . . 101n may be created and applied at an initialisation stage by using the static configuration tool 109 running on the host computer 108. Once this initialisation is completed, the observation module 111 may be run on the host computer 108 in order to monitor and observe the behaviour of the network devices 101a . . . 101n and the data flows on lines 102 during a runtime. In order to be able to continuously adapt a network device configuration in real time, the apparatus 110 employs a feedback method in order to gather traffic statistics, analyse them, compute optimal configurations according to monitored traffic conditions and then apply adjustments via the dynamic reconfiguration tool 112.

In one embodiment, the invention may exploit a feature of DPAA; namely that of PCD (Parse-Classify-Distribute) which may typically be implemented in a network device 101a by FMan (Frame Manager). PCD implements the ability to parse incoming traffic at wire speed in order to detect all protocols and identify protocol fields and packet attributes at L2, L3, L4 layers, classify traffic in different flows based on parser results and then distribute the frames to different queues for further processing purpose. Line rate hashing, packet spreading and distribution to frame queues (FQs) is supported by FMan hardware and may be configurable by initialization software created by using the static configuration tool 109. Once PCD is configured to split ingress traffic in different flows according to specific application needs then the observation module 111 may be arranged to gather all DPAA statistics per each flow in terms of: frame load, enqueued frames, dropped frames.

The supervisor module 113 may be arranged to analyse traffic conditions over time and to detect situations according to traffic dynamics when network resources (comprising the network elements 101 . . . 101n) should be reassigned in order to support heavy traffic flows without affecting high priority flows. In contrast with known methods such as load balancing (which represents traffic distribution across available resources in order to achieve optimal usage), the apparatus 110 of FIG. 1 may be arranged to promote resource re-assignment across existing traffic flows in order to achieve optimal usage. That is to say that instead of adapting traffic to system constraints, the system itself continuously adapts to traffic dynamics in order to maintain an optimal configuration over an extended period of time.

In order to achieve a continuous re-assignment of resources in real-time, the supervisor module 113 may be arranged to take into consideration the following factors. Firstly, resources may be only partially re-assigned between flows according to traffic dynamics. Secondly, resources may be re-assigned between flows according to their relative priorities. Thirdly, resources may not be re-signed in cases where high priority flows will be affected in the future. Fourthly, resources re-assignment may be done only in a limited amount which could be effectively re-allocated back to the original flow.

Figure 2:
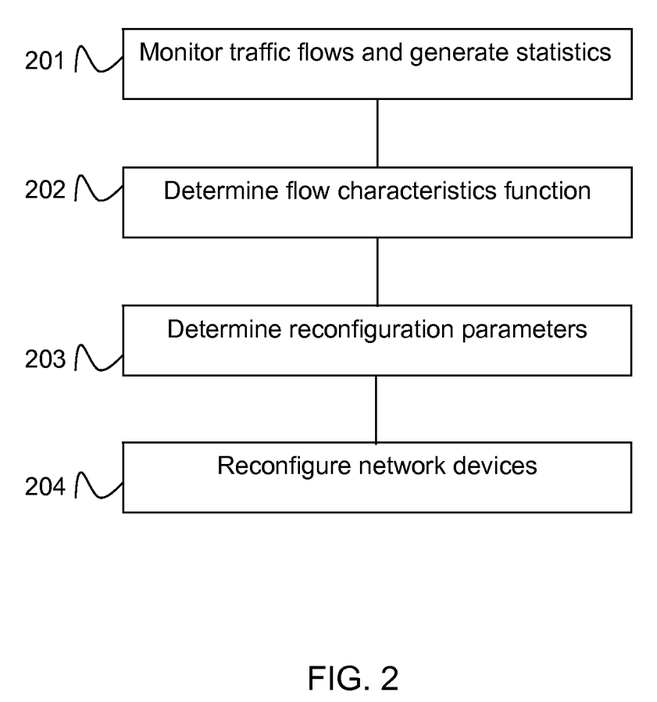
FIG. 2 is a simplified flowchart illustrating a first exemplary method of optimising a configuration of a network device.

A first exemplary method 200 for optimising a configuration of a communications device or network equipment will now be described with reference to FIG. 1 and the simplified flowchart of FIG. 2. The method (200) may be used in a system (100) comprising a plurality of network devices wherein each of said network devices is configured to handle one or more traffic flows. The system 100 may employ a DPAA architecture.

At 201, the traffic flows may be monitored, by the observation module 111, for example, and traffic statistics relating to said monitored traffic flows may be generated.

At 202, from the traffic statistics, a flow characteristic function for each traffic flow relative to each of said other monitored traffic flows may be determined, in the supervisor module 113, for example.

At 203, at least one determined flow characteristic function may be used, by the supervisor module 113, for example, in at least one adaptation algorithm to determine a value of a configuration parameter for at least one of said plurality of network devices.

At 204, a current configuration of said at least one of said network devices may adjusted in accordance with the determined value of the configuration parameter. This adjustment may be made by the dynamic reconfiguration tool 112, for example.

The invention permits resource reallocation between flows during suitable timeframes according to traffic dynamics So in one example, during an identified optimisation time interval during which a relatively high priority flow has a low traffic load and a low priority flow has a relatively high traffic load, resources may be reassigned from the lightly loaded, high priority flow to the heavily loaded low priority flow and without affecting the high priority flow.

In one embodiment, the flow characteristic function may be capable of characterising traffic flow properties over time; past, present and future.

An example of a method 300 for determining a flow characteristic function for use in one or more adaptation algorithms will now be described with reference to the flowchart of FIG. 3. Such a method may be carried out in the supervisor module 113 of FIG. 1, for example.

At 301, traffic flows statistics may be read.

Flow characteristic functions may be generated such that they characterize each flow relative to all other flows in the system 100 (of FIG. 1 for example). Flow characteristic functions ($f_k$) may be continuously re-evaluated at periodic time intervals for each one of the existing flows (k) and they may have the following properties. Firstly, they may be continuous in time. If this is the case then such flow characteristic functions may constitute an input for all adaptation algorithms. Secondly, they may characterize each flow in relation to all other existing flows. If this is the case, then this allows system resources (comprising network devices) to be only partially re-assigned between flows according to current traffic dynamics. Thirdly, they may support assignment of different priorities between flows according to their relative importance. This property can permit reassignment of network resources between flows according to their relative importance. Fourthly, they may be sensitive to small differences between very similar flows. For example, they may be able to track traffic history over time. This is advantageous because small differences between similar flows tend to become significant when there are accumulated over time. Fifthly, they may have the ability to estimate future traffic flow. For example a flow characteristic function may use a first derivative to calculate a slope and to estimate a traffic trend at each point which may represent a prediction of future system behavior.

The above properties for a flow characteristic function may be realised by basing an evaluation of such a function on a proportional, integral, derivative (PID) control law which may be adapted to support a relation between multiple flows of different priorities. As is known in the odd control law, a PID control law involves three separate components. A function of time u(t) may be written as:

$$u(t) = K_p e(t) + K_i \int_{t_o}^{t} e(\tau)d\tau + K_d \frac{d}{dt}e(t)$$

Firstly, a proportional component (P) may produce an output proportional to a current error value adjusted by multiplying the error by a constant comprising a proportional gain constant.

Secondly, an integral component (I) may produce an output proportional to both the magnitude of the error and the duration of the error represented by the sum of the instantaneous error over time. The accumulated error may then be multiplied by an integral gain.

Thirdly, a derivative component (D) may produce an output proportional to the rate of change of current error by determining the slope of the error over time multiplied by a derivative gain.

So firstly, once the traffic flow characteristics have been read, at 301, next, a characterisation of the relation between flows may be performed based on their priorities. In order to use a PID control law as a basis for flow characteristic function evaluation, the relation between different flows based on their relative importance may be performed by calculating an arithmetic mean between flow loads weighted by their assigned priority. So, at 302, flow priorities may be assigned to each traffic flow according to their importance and at 303 a flow average may be calculated.

The error used by the PID control law can be expressed as a relation between multiple flows of different priorities and may be written:

$$e_k(t) = p_k L_k(t) - \frac{\sum_{i=1, i \neq k}^{n} p_i L_i(t)}{n-1}$$

Where: p is the flow priority (assigned per each flow according to importance) and L(t) is traffic load over time per each flow.

A flow characteristic function may be obtained by replacing the error term in a PID control or with the above formula expressing a weighted relation between flows.

At 304, a proportional component of traffic flow may be used to consider the current traffic load at the present time.

At 305, an integral component may be used to consider traffic load history over time representing an accumulated traffic load from the past.

At 306, a derivative component may be used to consider traffic load slope representing a trend or prediction for system behaviour in the near future.

Hence an expression for a flow characteristic function may be written:

$$f_k(L_k(t)) = K_p \left[ p_k L_k(t) - \frac{\sum_{i=1, i \neq k}^{n} p_i L_i(t)}{n-1} \right] + K_i$$

$$\int_{t_0}^{t} \left[ p_k L_k(\tau) - \frac{\sum_{i=1, i \neq k}^{n} p_i L_i(t)}{n-1} \right] d\tau +$$

$$K_d \frac{d}{dt} \left[ p_k L_k(t) - \frac{\sum_{i=1, i \neq k}^{n} p_i L_i(t)}{n-1} \right]$$

Such a flow characteristic function may be used as an input for adaptation algorithms, at 307.

In one embodiment a flow characteristic function may be evaluated on the host computer 108 at every sampling period based on statistics gathered up until a specified "current" time. So in this case, a digital implementation of a flow characteristic function may be desirable and in order to obtain a discrete form of a flow characteristic function, the integral and the derivative terms may be approximated as follows:

$$\int_{t_0}^{t_q} e_k(\tau) d\tau = \sum_{j=1}^{q} e_k(t_j) \Delta t$$

$$\frac{d}{dt} e_k(t_q) = \frac{e_k(t_q) - e_k(t_{q-1})}{\Delta t}$$

In one exemplary embodiment, two discrete forms of a flow characteristic function may be obtained. A first discrete form of flow characteristic function may be written as:

$$f_k(L_k(t_q)) = K_p \left[ p_k L_k(t_q) - \frac{\sum_{i=1, i \neq k}^{n} p_i L_i(t_q)}{n-1} \right] +$$

$$K_i \sum_{j=1}^{q} \left[ p_k L_k(t_j) - \frac{\sum_{i=1, i \neq k}^{n} p_i L_i(t_j)}{n-1} \right] \Delta t +$$

$$K_d \frac{\left[ p_k L_k(t_q) - \frac{\sum_{i=1, i \neq k}^{n} p_i L_i(t_q)}{n-1} \right] - \left[ p_k L_k(t_{q-1}) - \frac{\sum_{i=1, i \neq k}^{n} p_i L_i(t_q - 1)}{n-1} \right]}{\Delta t}$$

and a second form of discrete flow characteristic function may be written as:

$$f_k(L_k(t_q)) =$$

$$f_k(L_k(t_{q-1})) + K_p \left[ \left( 1 + \frac{K_i \Delta t}{K_p} + \frac{K_d}{K_p \Delta t} \right) \left( p_k L_k(t_q) - \frac{\sum_{i=1, i \neq k}^{n} p_i L_i(t_q)}{n-1} \right) + \left( -1 - \frac{2K_d}{K_p \Delta t} \right) \left( p_k L_k(t_{q-1}) - \frac{\sum_{i=1, i \neq k}^{n} p_i L_i(t_{q-1})}{n-1} \right) + \frac{K_d}{K_p \Delta t} \left( p_k L_k(t_{q-2}) - \frac{\sum_{i=1, i \neq k}^{n} p_i L_i(t_{q-2})}{n-1} \right) \right]$$

It will be noted that although a calculated flow characteristic function may be evaluated according to traffic load, a graphical representation of the function will not necessarily be identical with actual flow load. This is because the flow characteristic function for each flow represents not the actual load flow but a prioritised relationship between a particular flow and all other existing flows. Moreover, the flow characteristic function is not evaluated by considering only present traffic but also traffic history and traffic trend. This means that a graphical representation of a flow characteristic function for a particular flow may be very different from a graphical representation of traffic load for the same flow.

In one embodiment the flow characteristic function may be periodically evaluated for all flows at specified time intervals according to a configurable sampling period and then may be used as an input for adaptation algorithms which may be designed to optimise different DPAA features.

Figure 4:
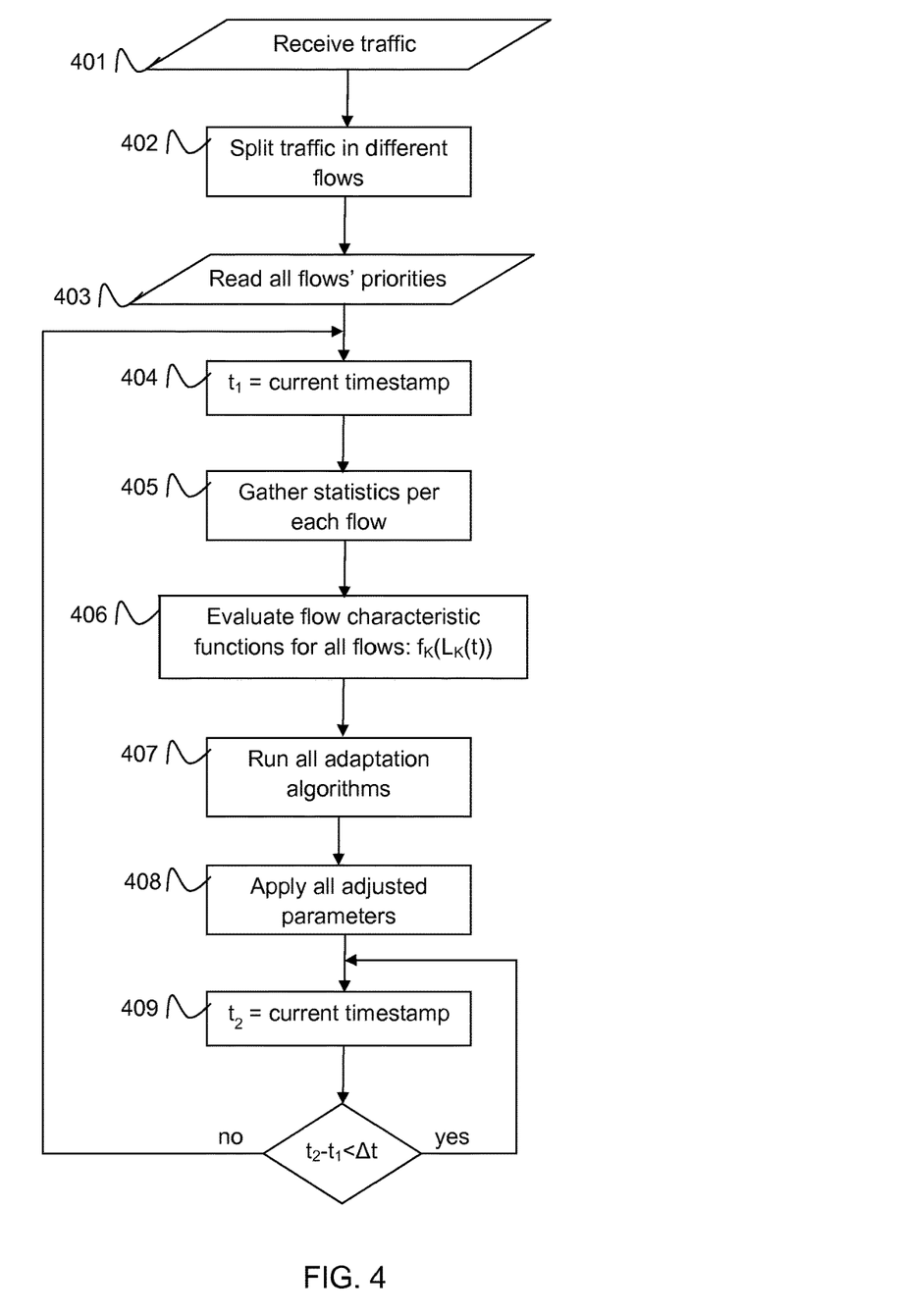
FIG. 4 is a simplified flowchart illustrating a second exemplary method of optimising a configuration of a network device.

A second exemplary method, 400, for optimising a configuration of a network device will now be described with reference to FIG. 1 and the simplified flowchart of FIG. 4.

At 401, traffic may be received by the various network devices 101a-101n comprising the system 100.

At 402 the traffic may be split into different flows. For example, traffic comprising a stream of packets having common properties such as protocol, destination, source or bit error rate for example is considered to comprise a particular traffic flow. As such, a traffic classification process may be used to split traffic where such traffic classification may comprise a set of matching rules or attributes allowing for logical grouping of data flows that share the same property or characteristic or set of characteristics: same protocol at different layers (for example; IP flow, non-IP flow at network layer, TCP flow, UDP flow, SCTP flow, other transport layer protocol flows at transport layer), same protocol fields (same source or destination, MAC address, IP address, TCP port, UDP port or other standard fields like Ethernet type, VLAN tags, MPLS tags), same protocol options (broadcast, multicast, stacked/tunneled protocols), same quality of service attributes (peak/committed information rate, peak/committed burst size, delay, jitter, packet dropping probability, bit error rate).

At 403, a priority which may be associated with each flow may be read.

At 404, a first timestamp may be applied.

At 405 traffic statistics for each flow may be gathered, by the observation module 111 for example, and provided to the supervisor module 113.

Figure 3:
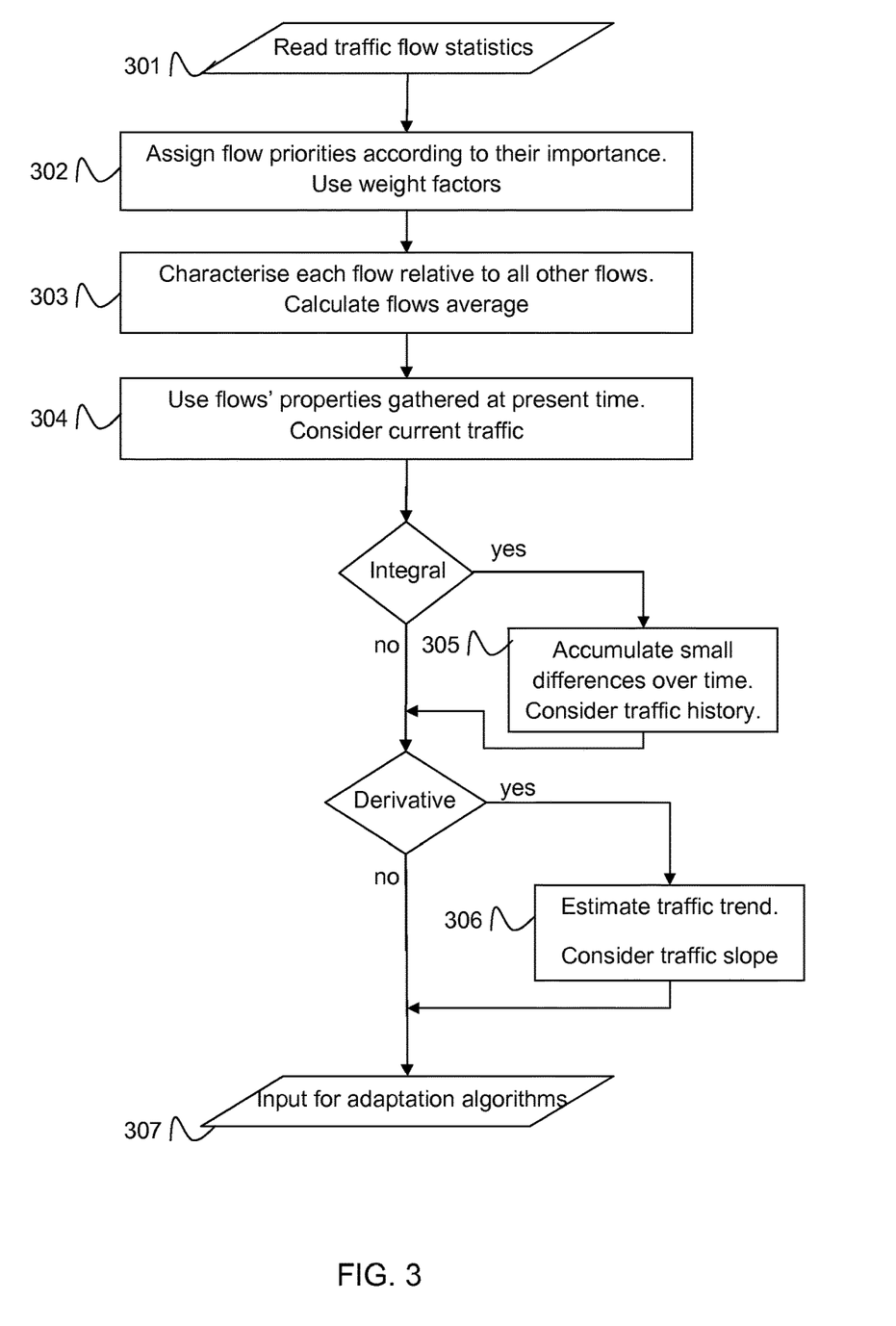
FIG. 3 is a simplified flowchart illustrating an exemplary method of determining a flow characteristic function.

At 406, flow characteristic functions for all flows may be evaluated using a process described herein with reference to FIG. 3.

At 407, one or more adaptation algorithms may be run using the evaluated flow characteristic functions as inputs to the algorithms. One example of an adaptation algorithm may be an analytic adaptation algorithm for frames discard probability. One of the DPAA features needed to be optimized according to traffic conditions is a Queue Manager algorithm for Congestion detection and avoidance. QMan (Queue Manager) supports three distinct algorithms; Weighted Random Early Discard (WRED), Congestion State Tail Drop (CSTD), Frame Queue Tail Drop (FQTD).

QMan defines a maximum of 256 different Congestion Group Records (CGRs). Frame Queues can be assigned to congestion group at an initialization stage. Each congestion group may be configured to track either byte counts or frame counts in all frame queues existent in the particular Congestion Group. The purpose of the adaptation algorithm for QMan CG Frames Discard Probability is to optimize QMan Enqueue operations during congestion situations by minimizing discards. Typically, a characteristic curve may be used by a conventional WRED algorithm which defines Discard Probability (DP) as a function of average byte count (or frame count) controlled by two thresholds (Minimum Threshold (minTH) and Maximum Threshold (maxTH) of byte count) and Maximum Discard Probability (MaxDP). These three parameters are user-configurable at initialization and may also be adjusted at runtime. By continuously adjusting the value of these parameters which define the WRED curve characteristic, the WRED algorithm behavior can be adapted according to traffic changes and may ultimately optimize QMan Enqueues.

Consider the case of two flows, one having a lower priority and the other having a higher priority. Typically, by default, the higher priority flow has the most resource allocated to it and so In the case of a WRED algorithm, the low priority flow has a higher maximum discard probability (MaxDP) than that of the higher priority flow. Consider a case where the low priority flow has a heavy traffic load and high priority flow has a light traffic load. In this case it is preferable that resources be re-assigned to support the heavier traffic. In the case of WRED algorithm this means that the maximum discard probability for low priority flow must be decreased. In this example, a configuration parameter to be adjusted may be the MaxDP which may be defined as a function of a given flow characteristic function the latter having been determined at 406. The given flow characteristic function may be flow load weighted by its priority. Hence, an adjustment may be made to a current, default value for MaxDP as follows: if the given flow characteristic function is greater than zero, then Max DP should be decreased. If the given flow characteristic function is less than zero, then Max DP should be increased.

At 408, this adjusted parameter and any other parameters which may have been calculated may be applied to the appropriate DPAA feature, network device.

At 409, a second timestamp may be applied and if the difference between the second and first timestamp is not less than predetermined period then the method may revert to 404 and further statistics may be gathered.

A second example of an adaptation algorithm may comprise a fuzzy adaptation algorithm, for frames discard probability, for example. In this example, the traffic statistics and flow priorities may be used by a fuzzy adaptation algorithm in conjunction with a fuzzy rules database to produce quantifiable parameters.

A third example of an adaptation algorithm may comprise a neural network learning algorithm, for frames discard probability for example. Such a neural network model may comprise a feedforward model and self-learning process based on an internal policy. This type of adaptation algorithm may be suitable for cases where certain patterns exist in network usage. It may be made to be self-adapting to traffic changes without requiring an analytic solution or a knowledge base in one example of use, a cost is associated with traffic statistics gathered by the observation module 111 and an action is generated according to a policy which attempts to minimise the long term cost. Subsequently MaxDP may be adjusted and after this adjustment is applied, a state transition may occur with an associated transition reward which may relate to enqueued frames.

Although the above embodiments have been described with reference to a host computer 108 which incorporates apparatus 110 for optimising a configuration of a network device and comprising an observation module 111, a dynamic reconfiguration tool 112 and the supervisor module 113, said apparatus and its constituents may be implemented in the network device itself rather than a host computer. This alternative embodiment, removes the necessity for a host computer and a remote server. Hence, gathering the traffic statistics, calculating flow characteristic functions and running adaptation algorithms at periodic time intervals to determine the configuration parameters and applying the configuration parameters may be performed by the network device 101a.

Hence, embodiments of the invention provide a method and apparatus capable of determining, in real-time, an optimal DPAA configuration for maximum efficiency during runtime usage.

The invention provides a complete feedback solution by closing the loop around the communications system comprising communications network hardware equipment.

Adding an adaptive layer on top of a runtime observation layer and dynamic reconfiguration layer provides the ability to automatically adapt a DPAA-based system to traffic conditions in real-time by dynamically changing certain configuration parameters in order to achieve an optimal configuration for a particular timeframe.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

As an example, a tangible computer program product may be provided having executable code stored therein to perform a method for optimising a configuration of a network device in a system comprising a plurality of network devices wherein each of said network devices is configured to handle one or more traffic flows, the method comprising; monitoring said traffic flows and generating traffic statistics relating to said monitored traffic flows, determining from the traffic statistics a flow characteristic function for each traffic flow relative to each of said other monitored traffic flows, using at least one determined flow characteristic function in at least one adaptation algorithm to determine a value of a configuration parameter for at least one of said plurality of network devices and adjusting a current configuration of said at least one of said network devices in accordance with the determined value of the configuration parameter.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims. For example, while the embodiments have been described with reference to network equipment and devices based on communication platforms using DPPA technology, the invention may be applied to other network devices capable of traffic classification. For example, embodiments of the invention may be used to optimise other network devices capable of splitting traffic into different flows, like, for example routers and/or switches.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the functionality of the observation module 111, dynamic reconfiguration tool 112 and supervisor 113 may be carried out by three, individual, discrete modules as represented in FIG. 1 or such functionality may implemented in one single module or device. Furthermore the functionality of any one of these three modules or combination of these three modules may be included with the functionality of the static configuration tool 109 and implemented in a single device or layer. In other embodiments, the supervisor may be configured in a layer separate from another layer which in turn may comprise the static configuration tool 109, the observation module 111 and the dynamic reconfiguration tool 112.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Further, the entire functionality of the apparatus 110 shown in FIG. 1 f which comprises the observation module 111, the dynamic reconfiguration tool 112 and the supervisor 113 may be implemented in an integrated circuit That is to say that apparatus for optimising a configuration of a network device may be implemented in an integrated circuit. Such an integrated circuit may be a package containing one or more dies. Alternatively, the examples may be implemented as any number of separate integrated circuits or separate devices interconnected with each other in a suitable manner. For example, an integrated circuit device may comprise one or more dies in a single package with electronic components provided on the dies that form the modules and which are connectable to other components outside the package through suitable connections such as pins of the package and bondwires between the pins and the dies.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. An apparatus for optimising a configuration of a network device in a system comprising at least one network device configured to handle one or more traffic flows, the apparatus comprising:

an observation module to monitor said traffic flows and generate traffic statistics relating to said monitored traffic flows;

a supervisor to receive the traffic statistics from the observation module, determine from the traffic statistics a flow characteristic function for each traffic flow relative to each of said other monitored traffic flows and use at least one determined flow characteristic function in at least one adaptation algorithm to determine a value of a configuration parameter indicating an allocation of resources of the network device to process a first traffic flow of said monitored traffic flows, and a dynamic reconfiguration tool to adjust a current configuration of the network device in accordance with the determined value of the configuration parameter and re-assign resources of the network device according to the indicated allocation to process the first traffic flow.

2. The apparatus of claim 1 wherein the apparatus is arranged to determine a flow characteristic function by determining any of proportional, integral and derivative components of traffic statistics.

3. The apparatus of claim 1 wherein the apparatus is arranged to assign a flow priority to each monitored traffic flow.

4. The apparatus of claim 1 wherein a traffic flow comprises a stream of packets having a common property.

5. The apparatus of claim 4 wherein the common property comprises at least one of the following: protocol, source, destination, packet dropping probability, or bit error rate.

6. The apparatus of claim 1 wherein traffic statistics comprise at least one of the following: frame load, enqueued frames, or dropped frames.

7. The apparatus of claim 1 wherein a configuration parameter comprises at least one of the following; maximum frame discard probability, maximum threshold byte count, minimum threshold byte count.

8. The apparatus of claim 1 wherein said apparatus is implemented in an integrated circuit device.

9. A tangible non-transitory computer readable medium having executable code stored therein to perform a method for optimising a configuration of a network device in a system comprising a plurality of network devices each configured to handle one or more traffic flows, the executable code, when executed by one or more processors, causing the more or more processors to:

monitor said traffic flows and generating traffic statistics relating to said monitored traffic flows, determine from the traffic statistics a flow characteristic function for each traffic flow relative to each of said other monitored traffic flows, use at least one determined flow characteristic function in at least one adaptation algorithm to determine a value of a configuration parameter indicating an allocation of resources of the network device to process a first traffic flow of said monitored traffic flows, and adjust a current configuration of the network device in accordance with the determined value of the configuration parameter and re-assign resources of the network device according to the indicated allocation to process the first traffic flow.

10. The tangible non-transitory computer readable medium of claim 9 wherein the tangible non-transitory computer readable medium comprises at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

11. The tangible non-transitory computer readable medium of claim 9 wherein traffic statistics comprise at least one of the following: frame load, enqueued frames, or dropped frames.

12. The tangible non-transitory computer readable medium of claim 9 wherein the at least one adaptation algorithm governs configuration of the network device.

13. The apparatus of claim 1 wherein the at least one adaptation algorithm governs configuration of the network device.

\* \* \* \* \*